United States Patent [19]

Ross et al.

[11] Patent Number: 4,634,278
[45] Date of Patent: Jan. 6, 1987

[54] METHOD OF THREE-DIMENSIONAL MEASUREMENT WITH FEW PROJECTED PATTERNS

[75] Inventors: Joseph Ross, Ft. Salonga; Richard Schmidt, Huntington, both of N.Y.

[73] Assignee: Robotic Vision Systems, Inc., Hauppauge, N.Y.

[21] Appl. No.: 577,331

[22] Filed: Feb. 6, 1984

[51] Int. Cl.$^4$ .............................................. G01B 11/24
[52] U.S. Cl. .................................. 356/376; 250/558; 356/2
[58] Field of Search ........................... 356/2, 375, 376; 250/558

[56] References Cited

U.S. PATENT DOCUMENTS 4,175,862  11/1979  DiMatteo et al. .................. 356/2 X Primary Examiner—F. L. Evans
Attorney, Agent, or Firm—Max Fogiel

[57] ABSTRACT

Methods are provided for reducing the number of projected patterns required to make two- or three-dimensional surface measurements on a sub-class of surfaces comprising relatively smooth surfaces. By including apriori knowledge about the surface to be measured, pattern ambiguities can be resolved by processing rather than by additional projected patterns.

3 Claims, 11 Drawing Figures 1 2 3 4 5 6 7 8
0 1 1 1 0 1 0 0

METHOD OF THREE-DIMENSIONAL MEASUREMENT WITH FEW PROJECTED PATTERNS

BACKGROUND OF THE INVENTION

One method of making three-dimensional (3-D) measurements is to project patterns on a surface and view them from an angle off of the projection axis. Then, via triangulation, the distance to the surface points can be computed. In order to solve the triangulation equation for depth however, the other two dimensions must first be known. The present invention provides several methods that accomplish this with fewer patterns than required in the prior art for surfaces known apriori to be relatively smooth. This method will also find application wherever 2-D mensuration is the end goal.

SUMMARY OF THE INVENTION

It is an object of the present invention to overcome the prior art disadvantages. More particularly, it is an object of the present invention to provide methods to identify two of the three-dimensions that define a point on a surface using fewer codes than in the prior art.

In keeping with this object and with still others which will become apparent as the description proceeds, one aspect of the invention resides in projecting a single pattern on a surface that enables identifying the specific region of the pattern within a short traverse of the pattern over a distance on the surface which is free of surface discontinuities such as holes and steps.

A second aspect of the invention resides in first projecting a uniform beam of light to establish the surface reflectance characteristics and then projecting a single pattern on the surface as in the first aspect and using intensity comparison to identify elements of the code.

A third aspect of the invention resides in projecting a single plane of light upon the surface to unambiguously establish its intersection with the surface and projecting a succession of periodic patterns from which complete dimensional information can be obtained relative to the single plane.

A fourth aspect of the invention resides in projecting a single pattern on the surface as in the first aspect and then projecting a succession of periodic patterns as in the third aspect in order to obtain complete dimensional information.

A fifth aspect of the invention resides in projecting a single pattern on the surface as in the first aspect and simultaneously recording that pattern by at least a second sensor system. The pattern contains structure in the directions of the two defining dimensions. The measured location of at least three non-collinear points on the surface is used to register the measurements of the first sensor with the other(s).

A sixth aspect of the invention resides in projecting first one pattern on the surface as in the first aspect, then projecting a second pattern perpendicular to the first, and simultaneously recording each pattern by at least a second sensor system; each pattern containing structure in a different direction of the two defining dimensions. The measured location of at least three non-collinear points on the surface is used to register the measurements of the first sensor with the other(s).

A seventh aspect of the invention resides in including in the projected patterns at least one part illuminated by a different frequency (color) than the rest in order to provide a reference location from which the remaining dimensions can be derived.

An eighth aspect of the invention resides in employing a line width modulated pattern projected upon a surface which uniquely identifies a reference location from which the remaining dimensions can be derived.

A ninth aspect of the invention resides in projecting a periodic intensity pattern on a surface and using the pattern edge to provide the reference from which the remaining dimensions can be derived.

A tenth aspect of the invention resides in incorporating at least one discontinuity in a periodic projected pattern to provide a reference location within the pattern.

The invention will hereafter be described with reference to exemplary embodiments, as illustrated in the drawings. However, it is to be understood that these embodiments are illustrated and described for the purpose of information only, and that nothing therein is to be considered limiting of any aspect of the invention.

DESCRIPTION OF THE PREFERRED EMBODIMENTS

Figure 1:
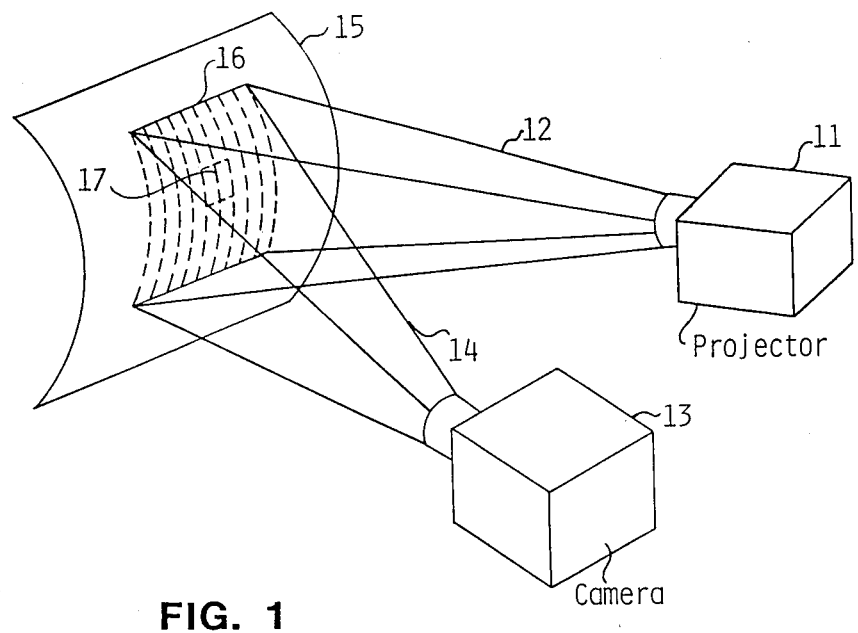
FIG. 1 shows a smooth surface with a hole that is less than the size of the viewable area of a 3-D measurement sensor.
Figure 2:
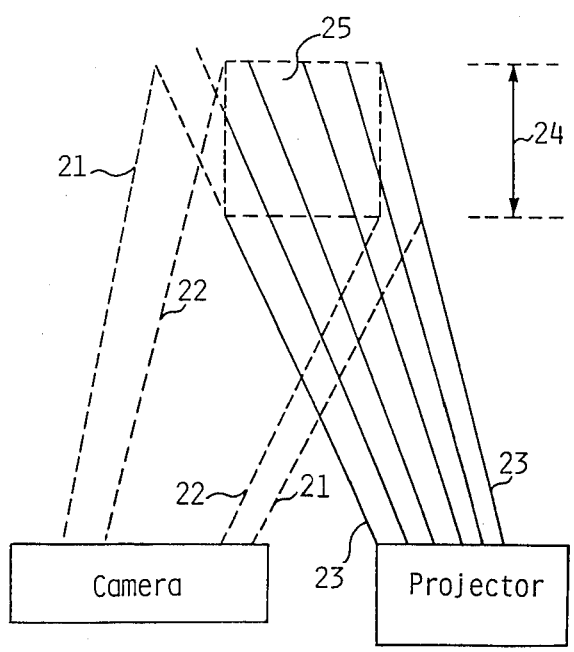
FIG. 2 is a top view of the 3-D sensor, outlining its region coverage.

FIG. 1 illustrates a prior art method of mensuration employing projected light patterns and a viewing device (the camera). The projector 11, light beam 12 and the field of view 14 of the camera 13 are positioned such that they intersect at an angle in a common volume within which measurements can be made by triangulation. A top view of the system is shown in FIG. 2 where the common volume appears as area 25. The prior art has used a binary sequence of projected planes to acquire the necessary data to unambiguously determine the three-dimensions of any point within the volume. This requires at least ten patterns to resolve the volume into 1024 segments. For reasons of complexity, time to acquire data, data storage and sensitivity to motion, it is desirable to use fewer patterns. The present invention provides several methods that are applicable for relatively smooth surfaces. In general, any method for determining a dimension in the direction of the width of the camera 13 view, can be just as well applied to the height of the camera 13 view. For this reason we shall generally only describe the method in terms of establishing the dimension in the direction of width.

In general, the distances between projected light planes and/or the width of light planes are employed to determine locations within coded patterns of projected light. These distances and/or widths are changed (enlarged or reduced in dimension) due to the varying distance and/or angle of the surface being measured relative to the measurement system. However, the ratio of significant distances within the patterns remain nearly invariant and can be used to automatically process the pattern images. This essentially is an automatic normalization feature that can be incorporated into the measurement process.

Figure 3:
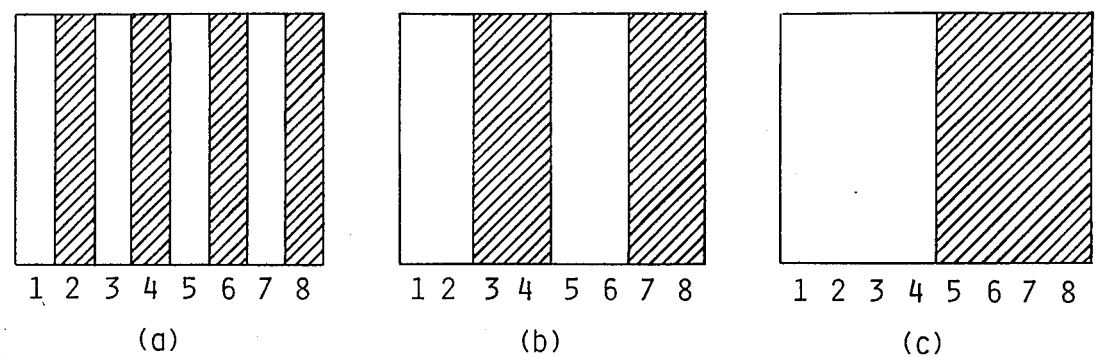
FIGS. 3(a)-3(c) show three projected light patterns as they may appear on a surface to be measured.
Figure 4:
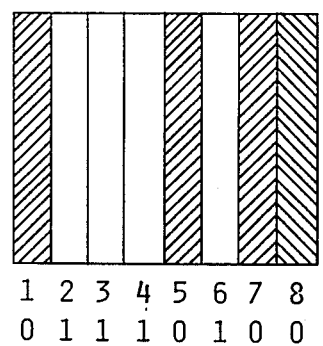
FIG. 4 shows a pattern of projected light that allows unambiguous position identification and its segment identification table.

In projecting a binary pattern sequence, such as the sequence shown in FIG. 3 which can identify eight unique locations, the pattern having fewest changes (3c) unambiguously divides the volume into two segments—the white area where light is present and the cross hatched area where no light is present. However, for better resolution the other patterns are required. Pattern 3b divides the volume into 4 segments, but if the light from one white area cannot be distinguished from the other then the measurement is ambiguous. Likewise pattern 3a resolves 8 segments but cannot distinguish between the 4 white areas from which the light may derive. However in one preferred embodiment a pattern, as given in FIG. 4, is projected, and by analyzing any three adjacent segments, as illustrated in the table below, any segment can be uniquely identified. This table is given for the cases of looking at the segment and one to either side. By extending this concept up to, say 1024 segments, an examination of 10 adjacent segments (only 1% of the width) uniquely defines the location with a single pattern.

| Segment | Local Pattern |
|---|---|
| 1 | 0 0 1 |
| 2 | 0 1 1 |
| 3 | 1 1 1 |
| 4 | 1 1 0 |
| 5 | 1 0 1 |
| 6 | 0 1 0 |
| 7 | 1 0 0 |
| 8 | 0 0 0 |

Figure 5:
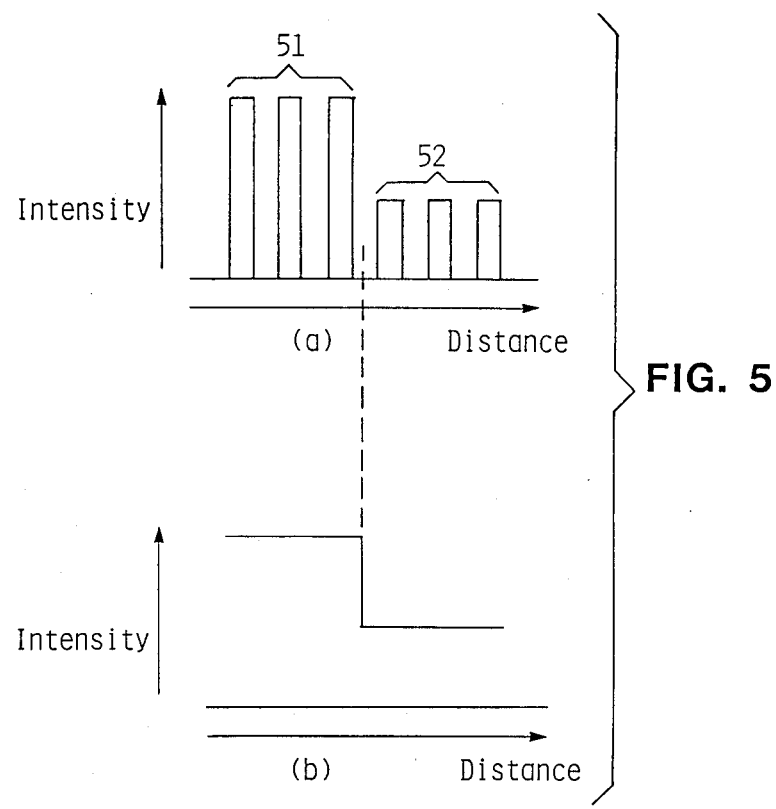
FIG. 5 shows intensity profiles of light patterns on a surface with two reflectivities.

In a second preferred embodiment an additional step is required. In its simplest form a uniform beam of light 12 is projected onto the same surface area 16 as the special pattern of the first embodiment (but at separate times). From the uniform beam of light, any difference in received light intensity within the scene measured by the camera 13 can be attributed to variations in reflectance caused by the surface angle and/or absorption property. This then enables more reliable automatic processing of the pattern data. FIG. 5 illustrates a simplified intensity profile for a surface with two different reflectances. The uniform light beam results in the profile of (b) and the pattern light beam results in the profile of (a). A fixed threshold at a level between pattern group 51 and group 52 in (a) would detect group 51 but not 52. Such a high threshold may be required in the region of group 51 to prevent false detection due to multiple reflections or other interference but the level can probably be lowered in the region of group 52 for the same false detection rate because of the lower surface reflectivity. The lower reflectivity would similarly affect the interfering light as it affects the projected light pattern, so that the lower threshold would provide the same detection performance as in the higher reflectance region with the higher threshold.

In a third preferred embodiment, a single plane of light (say segment 5 of FIG. 3(a)) is projected onto the surface at a time other than when the full pattern of FIG. 3(a) is projected. This unambiguously identifies segment 5, and by implication, all the other segments on a smooth surface. Hence, two rather than three patterns are able to resolve the ambiguity. This becomes much more significant when 1024 segments are used and still only two, not ten, patterns resolve the ambiguity.

In a fourth preferred embodiment, a pattern as described in the first embodiment is projected onto the surface and finer resolution patterns are projected at other times to increase the detail of the measurement. For example, projecting the pattern of FIG. 4 unambiguously locates segment 3 by noting it is white and the segments on either side are also white. However, the exact location of segment 3 is implied, not directly measured. By projecting separately the pattern of FIG. 3(a) we can directly measure the exact location of segment 3. The two pieces of information taken together completely describe the segment 3 location in the width direction.

Figure 6:
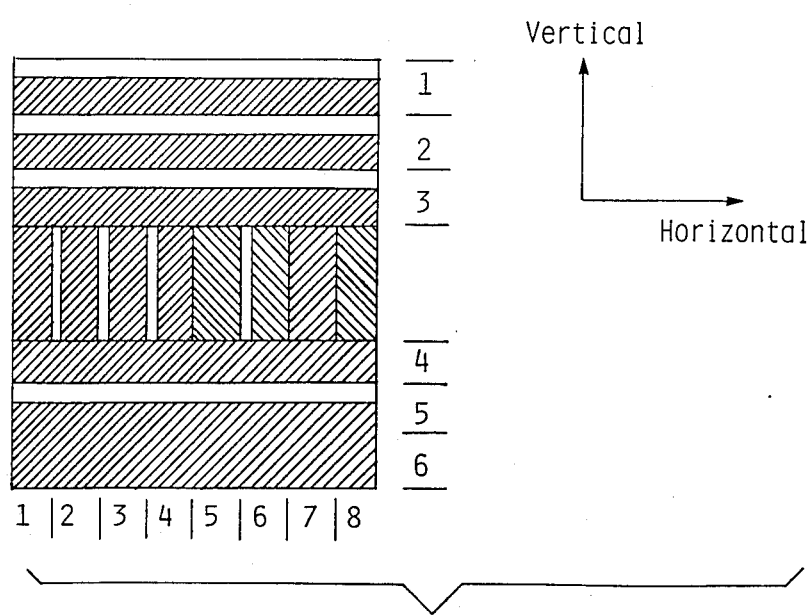
FIG. 6 shows a projected light pattern that provides unambiguous position identification in two directions.
Figure 7:
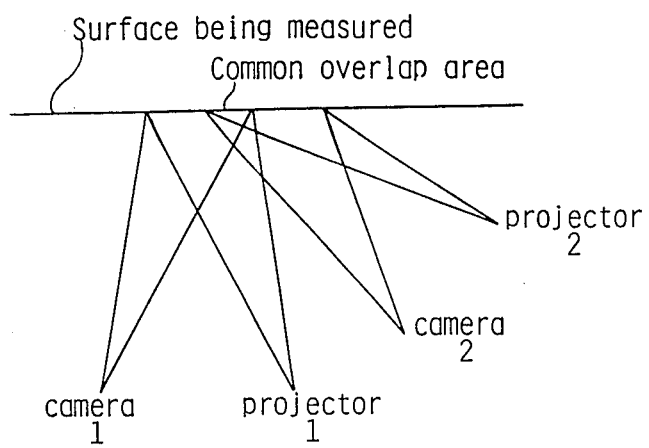
FIG. 7 shows a top view of two 3-D sensors measuring two partially overlapping areas on a surface.

In a fifth preferred embodiment, a pattern as shown in FIG. 6 is projected on a surface which need only have three non-collinear smooth areas, each area being large enough to encompass a length of code sufficient to identify the code state. For the example shown, a length of 3 segments each for vertical and horizontal is required. An alternate method of generating patterns is shown in which, unlike FIGS. 3 and 4, illuminated segments are only partially illuminated; this may be beneficial for more reliable pattern recognition and finer position resolution. It will be noted that the center section contains the same code shown in FIG. 4 so that eight segment locations are identifiable in the horizontal direction. In the vertical direction two groups of three segments each are shown. Such a bidirectional pattern can be readily extended to many more segments horizontally and vertically by alternating vertical and horizontal rows of patterns in the vertical direction. Other pattern groupings such as a checkerboard is usable. The measuring system camera signals can be analyzed to determine the two- or three-dimensional co-ordinates of the surface as in the previous embodiments. In addition, a second measurement system camera can record the same pattern and that system can proceed independently to measure the overlapping surface area. A comparison of at least three non-collinear points in the overlapping surface area with regard to the dimensions obtained by the two systems will allow the two to be registered relative to one another. That is, the two data sets can be correctly referenced to a common reference frame. FIG. 7 shows a top view of such a setup which allows piecing together separate data sets for measuring surfaces greater than the limits of a single measurement system. The 3-D co-ordinates of three non-collinear points completely define the six degrees of freedom of 3-D space so that unambiguous registration can be obtained. More points can be used with least squares regression.

In a sixth preferred embodiment, the data of two measurement systems can be registered to each other as in the fifth embodiment. However, in place of the bidirectional pattern of FIG. 6, the unidirectional pattern of FIG. 4 is used twice. First the pattern of FIG. 4 is projected in one orientation for both systems to record and establish registration in that direction and then the same or similar pattern is projected after rotating the pattern approximately 90° about the projection axis. Both systems record the second pattern and complete the registration process.

In a seventh preferred embodiment, a pattern such as in FIG. 3(a) is projected and the ambiguity is resolved by using a different frequency (color) for at least one of the illuminated segments shown as white in the figure. The camera can either sequentially record the pattern with different filters or multiple cameras with different filters can record the pattern and location of the uniquely colored segment used as the reference from which the other segments may be identified.

Figure 8:
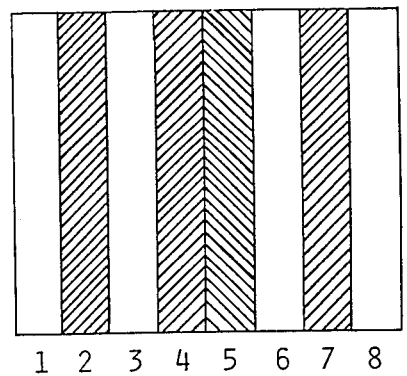
FIG. 8 shows a projected light pattern that has a distinguishing wide segment.

In an eighth preferred embodiment, a pattern such as in FIG. 8 is projected on the surface to be measured that contains at least one segment of the periodic pattern with a different width that establishes a reference location within the pattern from which the location of the other segments can be determined.

In a ninth preferred embodiment, a periodic pattern such as in FIG. 3(a) is projected on the surface to be measured and at least a part of either the right or left edges of the pattern lie on the surface. If the last illuminated segment (1 or 7 in FIG. 3(a)) can be recorded by the camera, the surface is smooth and continuous up to the areas within the pattern to be measured and it is known apriori that the segment to be used as a reference will lie on the surface, then that segment can be used as a reference location from which the locations of the other segments can be determined.

Figure 9:
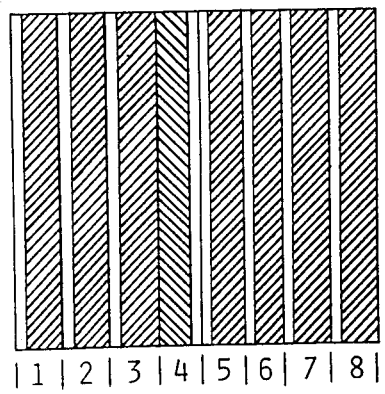
FIG. 9 shows a projected light pattern that has a distinguishing discontinuity.

In a tenth preferred embodiment, a periodic pattern containing at least one aperiodic component, such as illustrated in FIG. 9 in which segment 4 has its right edge rather than left edge illuminated, is projected on the surface to be measured. Again the restrictions are that the surface from the reference segment to the area of interest be smooth and continuous and it be assured that the reference segment will project onto the surface. As long as surface irregularities do not cause other parts of the projected pattern to emulate the intentional aperiodic component, an automatic search for the reference segment can be implemented in processing the recorded data. The locations of the other segments can then be determined from the reference segment.

The invention has been described and illustrated with reference to exemplary embodiments. It is not to be considered limited thereto, inasmuch as all modifications and variations which might offer themselves are intended to be encompassed within the scope of the appended claims.

What is claimed is:

1. A method for unambiguously identifying the location of a point within the view of a two- or three-dimensional measurement sensor with a single projected pattern comprising the steps of: projecting a binary pattern having unique codes over any span of N segments out of a total of as many as $2^N$ segments onto a surface to be measured, so that said segments form uniquely identifiable local patterns; recording reflected radiation with a detector and generating a recorded signal; analyzing the recorded signal and providing, a digital representation thereof; and identifying the location of the point in the pattern by comparing the digital representation with a known reference pattern digital representation.

2. A method for unambiguously identifying the location of a point within the view of a two- or three-dimensional measurement sensor as defined in claim 1, and locating said point within a predetermined resolution with relatively few projected patterns; projecting at least one higher resolution pattern on the surface to be measured; recording radiation reflected from said surface to be measured; and computing the location of said point to a higher resolution.

3. A method for unambiguously identifying the location of a point within the view of a two- or three-dimensional measurement sensors with an adaptive threshold comprising the steps of: projecting a uniform light intensity beam on an area of measurement; recording radiation reflected from said area; determining relative reflected intensity for each part of the beam; adjusting a decision threshold for each corresponding part; said decision threshold being made more sensitive where said reflected intensity is determined to be low, and said decision threshold being made less sensitive where said reflected intensity is determined to be high; projecting a binary pattern having unique codes over any span of N segments out of a total of as many as $2^N$ segments onto said area of measurement; recording reflected radiation from said area and generating a recorded signal; analyzing the recorded signal using said adjusted decision threshold and providing a digital representation of said recorded signal; and identifying the location of the point in the pattern by comparing the digital representation with a known reference pattern digital representation.

* * * * *